(12) United States Patent
Tsonis et al.

(10) Patent No.: US 10,590,580 B2
(45) Date of Patent: Mar. 17, 2020

(54) VECTOR DEFINED EMBROIDERY

(71) Applicant: Pulse Microsystems Ltd., Mississauga (CA)

(72) Inventors: Anastasios Tsonis, Kitchener (CA); Brian J. Goldberg, Thornhill (CA); Claude Vlandis, Bay Harbor Islands, FL (US); William M. Collins, Oakville (CA)

(73) Assignee: PULSE MICROSYSTEMS LTD., Mississauga, Ontario (CA)

( * ) Notice: Subject to any disclaimer, the term of this patent is extended or adjusted under 35 U.S.C. 154(b) by 0 days.

(21) Appl. No.: 16/006,627

(22) Filed: Jun. 12, 2018

(65) Prior Publication Data

US 2019/0376220 A1 Dec. 12, 2019

(51) Int. Cl.
*D05C 5/06* (2006.01)
*G05B 15/02* (2006.01)
*D05C 5/02* (2006.01)
*D05B 19/08* (2006.01)
*G06Q 20/12* (2012.01)

(52) U.S. Cl.
CPC .............. *D05C 5/06* (2013.01); *D05B 19/08* (2013.01); *D05C 5/02* (2013.01); *G05B 15/02* (2013.01); *G06Q 20/123* (2013.01); *D05D 2205/02* (2013.01); *D05D 2205/18* (2013.01); *D10B 2501/06* (2013.01)

(58) Field of Classification Search
None
See application file for complete search history.

(56) References Cited

U.S. PATENT DOCUMENTS

| | | | | |
|---|---|---|---|---|
| 4,932,342 A | * | 6/1990 | Hisatake | D05B 19/12 112/103 |
| 5,343,401 A | * | 8/1994 | Goldberg | D05B 19/08 112/475.19 |
| 5,646,861 A | * | 7/1997 | Kotaki | D05B 19/08 700/138 |
| 5,662,055 A | * | 9/1997 | Hartwig | D05B 19/04 112/102.5 |
| 5,771,173 A | * | 6/1998 | Tsonis | D05B 19/08 112/475.19 |

(Continued)

*Primary Examiner* — Ramesh B Patel
(74) *Attorney, Agent, or Firm* — Allan Watts

(57) ABSTRACT

Computerized methods and software for creating customized embroidery. Embodiments include capturing a drawing from a user in a browser window as captured vectors, receiving the captured vectors and desired stitching parameters at an embroidery engine on a server, and creating a planned pattern of stitches from the captured vectors and the desired stitching parameters. Some embodiments include returning a rendering of the planned pattern of stitches to the browser or returning rendering vectors to the browser for drawing the planned pattern of stitches in the browser for inspection by the user. The drawing can include a freehand drawing, handwriting, or a signature, drawn or written by the user in the browser window. The desired stitching parameters can include angle, width, underlay type, density, or pull compensation of the stitches. In some embodiments, width varies along a vector path, for instance, based on pressure applied by the user while drawing.

20 Claims, 3 Drawing Sheets

(56) References Cited

U.S. PATENT DOCUMENTS

| | | | |
|---|---|---|---|
| 5,809,921 A * | 9/1998 | Mok | D05C 17/00 112/102.5 |
| 5,865,134 A | 2/1999 | Okuyama | |
| 5,924,372 A | 7/1999 | Okuda | |
| 5,924,374 A | 7/1999 | Mori | |
| 5,893,200 A | 11/1999 | Slotznick | |
| 5,988,083 A | 11/1999 | Tomita | |
| 6,012,404 A | 1/2000 | Ogawa | |
| 6,012,890 A | 1/2000 | Garrido | |
| 6,196,146 B1 * | 3/2001 | Goldberg | D05B 19/10 112/102.5 |
| 6,209,467 B1 * | 4/2001 | Tomita | D05B 19/06 112/102.5 |
| 6,216,618 B1 * | 4/2001 | Goldberg | D05B 19/02 112/102.5 |
| 6,430,460 B1 * | 8/2002 | Taguchi | D05B 19/08 112/102.5 |
| 6,587,745 B1 * | 7/2003 | Polden | D05B 19/08 112/475.19 |
| 6,968,255 B1 * | 11/2005 | Dimaridis | D05B 19/08 112/475.19 |
| 7,457,683 B2 * | 11/2008 | Bailie | D05B 19/08 112/470.01 |
| 8,311,660 B2 * | 11/2012 | Weedlun | B44F 7/00 700/133 |
| 9,103,059 B2 * | 8/2015 | Goldman | G06T 11/60 |
| 2005/0154487 A1 * | 7/2005 | Wang | A41H 1/00 700/132 |
| 2006/0064195 A1 * | 3/2006 | Kern | D05B 19/12 700/138 |
| 2008/0127871 A1 * | 6/2008 | Tashiro | D05B 19/08 112/470.01 |
| 2010/0228383 A1 * | 9/2010 | Taguchi | D05B 19/10 700/138 |
| 2011/0169924 A1 * | 7/2011 | Haisty | H04N 9/3147 348/51 |
| 2012/0116569 A1 * | 5/2012 | Yamada | D05B 19/10 700/138 |
| 2012/0222602 A1 * | 9/2012 | Hishida | D05B 19/08 112/470.05 |
| 2013/0186316 A1 * | 7/2013 | Mizuno | D05B 19/10 112/102.5 |
| 2014/0182499 A1 * | 7/2014 | Matsushima | D05B 19/08 112/470.04 |
| 2014/0277663 A1 * | 9/2014 | Gupta | G06F 17/50 700/98 |
| 2015/0267331 A1 * | 9/2015 | Kato | D05B 19/10 700/138 |
| 2017/0316590 A1 * | 11/2017 | Kongo | D05C 3/02 |

* cited by examiner

VECTOR DEFINED EMBROIDERY

FIELD THE INVENTION

Various embodiments of this invention relate to computerized methods, systems, and software for creating customized embroidery. Particular embodiments concern methods, systems, and software that use vectors to define embroidery patterns.

BACKGROUND OF THE INVENTION

Computerized methods, systems, and software, have been contemplated for creating embroidery, including customized embroidery, for a user. In addition, various embodiments have been described that used the Internet for communication. U.S. Pat. No. 6,196,146 (Goldberg) describes an example and is incorporated herein by reference. Prior art, however, has been limited in the way a creative work from a user has been captured, defined, or communicated, for example, to or from an embroidery engine, for instance, software that takes as input shapes and/or stitching parameters and generates and returns a pattern of stitches. Further, limitations have existed in the way desired stitching parameters have been captured, defined, or communicated, and in the way planned patterns of stitches have been communicated or presented, for example, for inspection by a user. Still further, limitations have existed in the types of creative works that have been used for creating customized embroidery for users. Room for improvement exists over the prior art in the way a creative work from a user, desired stitching parameters, or both, are captured, defined, or communicated, for example, to an embroidery engine. Further still, room for improvement exists in the way planned patterns of stitches are communicated or presented, for example, for inspection by a user, and in the types of creative works that are used for creating customized embroidery. Potential for benefit exists in these and other areas that may be apparent to a person of skill in the art having studied this document.

SUMMARY OF PARTICULAR EMBODIMENTS OF THE INVENTION

Various embodiments are or include a computerized method or computer program, for example, for creating customized embroidery for a user. In many embodiments, for instance, the method or software includes (e.g., using a computer or computing device), various acts. In various embodiments, for example, such acts include, capturing certain information as vectors, communicating the vectors, and in some embodiments, other information (e.g., desired stitching parameters), to an embroidery engine, and creating a planned pattern of stitches from the captured vectors and, in particular embodiments, the other information. Some embodiments further include displaying a rendering of the planned pattern of stitches, for instance, for inspection by the user. Further, certain embodiments further define how the planned pattern of stitches is communicated, the type of information that is captured, or how the information is captured.

Needs or potential for improvement exist in the way a creative work from a user is captured, defined, or communicated, for example, to an embroidery engine. Further, needs or potential for improvement or benefit exist in the way desired stitching parameters are captured, defined, or communicated, and in the way planned patterns of stitches are communicated or presented, for example, for inspection by a user. Still further, needs or potential for improvement or benefit exist in the types of creative works that are used for creating customized embroidery. Further still, needs or potential for improvement or benefit exist in these and other areas that may be apparent to a person of skill in the art having studied this document.

Specific embodiments include various (e.g., computerized) methods of creating (e.g., customized) embroidery, for example, for a user. In a number of embodiments, for example, the method includes (e.g., at least) various acts. In various embodiments, for instance, such acts include (e.g., using a computing device) capturing a drawing from the user, for example, in a browser window, as a first set of captured vectors. Further, in many embodiments, the method includes (e.g., receiving) the first set of captured vectors and desired stitching parameters, for instance, at an embroidery engine on a server. Further, in a number of embodiments, the method includes creating a planned pattern of stitches, for example, from the first set of captured vectors and the desired stitching parameters.

In particular embodiments, for example, the creating of the planned pattern of stitches (e.g., from the first set of captured vectors and the desired stitching parameters) is performed at the server, the desired stitching parameters are captured using the computing device (e.g., computer), or both. Further, in some embodiments, the method further includes returning a rendering (e.g., bitmap) of the planned pattern of stitches (e.g., to the browser), for instance, for inspection by the user. Even further, some embodiments include returning a second set of rendering vectors (e.g., to the browser), for example, for drawing the planned pattern of stitches (e.g., in the browser), for instance, for inspection by the user.

Moreover, in various embodiments, the capturing of the drawing in the browser window includes capturing a freehand drawing (e.g., that is drawn by the user, for instance, in the browser window), capturing handwriting (e.g., that is written by the user, for example, in the browser window), capturing a signature (e.g., that is written by the user, for instance, in the browser window), or a combination thereof. Furthermore, in a number of embodiments, the (e.g., receiving) of the first set of captured vectors and desired stitching parameters (e.g., at the embroidery engine, for example, on the server) includes receiving a desired angle of the stitches, receiving a desired width of the stitches, or both. Further, in some embodiments, the desired width of the stitches varies, for example, along a vector path of the drawing (e.g., from the user). Still further, in particular embodiments, the capturing of the drawing (e.g., in the browser window) includes capturing the desired width of the stitches (e.g., along the vector path) based on a pressure applied (e.g., by the user) while drawing (e.g., the vector path), for instance, in the browser window. Further still, in certain embodiments, the creating of the planned pattern of stitches (e.g., from the first set of captured vectors and the desired stitching parameters) includes creating running stitches, for instance, that are parallel to a vector path (e.g., of the drawing from the user). Even further, in some embodiments, the creating of the planned pattern of stitches (e.g., from the first set of captured vectors and the desired stitching parameters) includes creating multiple-ply running stitches (e.g., that are parallel to a vector path, for example, of the drawing, for instance, from the user). Even further still, in various embodiments, the receiving of the first set of captured vectors and desired stitching parameters (e.g., at the embroidery engine, for instance, on the server) includes receiving an underlay type of the stitches, receiving a density of the stitches, receiving a pull compensation of the stitches, or a combination thereof, as examples.

Further, other specific embodiments include various computer programs, for example, that include computer-readable instructions which, when executed by the computing device, cause the computing device to perform certain acts. In some embodiments, for example, such acts include capturing a drawing (e.g., from a user), for instance, as a first set of captured vectors, (e.g., transmitting) the first set of captured vectors and desired stitching parameters (e.g., to an embroidery engine, for instance, on a server), or both. Further, in many embodiments, such acts include displaying a rendering of a planned pattern of stitches (e.g., for inspection by the user). Still further, in a number of such embodiments, the planned pattern of stitches is or has been created from the first set of captured vectors and the desired stitching parameters, for example. Even further, in particular embodiments, the computer program further includes computer-readable instructions which, (e.g., when executed by the computing device), cause the (e.g., computer) to draw the planned pattern of stitches (e.g., for inspection by the user), for instance, using a second set of rendering vectors (e.g., returned to the computing device from the embroidery engine on the server). Even further still, in certain embodiments, the computer program includes computer-readable instructions which, when executed by the computing device, cause the computing device to draw the planned pattern of stitches for inspection by the user using a recipe that includes multiple parameters based on a type of fabric.

Other embodiments include computer systems and computer-readable storage media that contain computer-readable instructions that perform similar acts or communicate similar information. Many embodiments provide, for example, as objects or benefits, computer tools that, in whole or in part, create customized embroidery (e.g., for a user), for instance, using vectors. In addition, various other embodiments of the invention are also described herein, and other benefits of certain embodiments are described herein or may be apparent to a person of skill in this area of technology.

Figure 1:
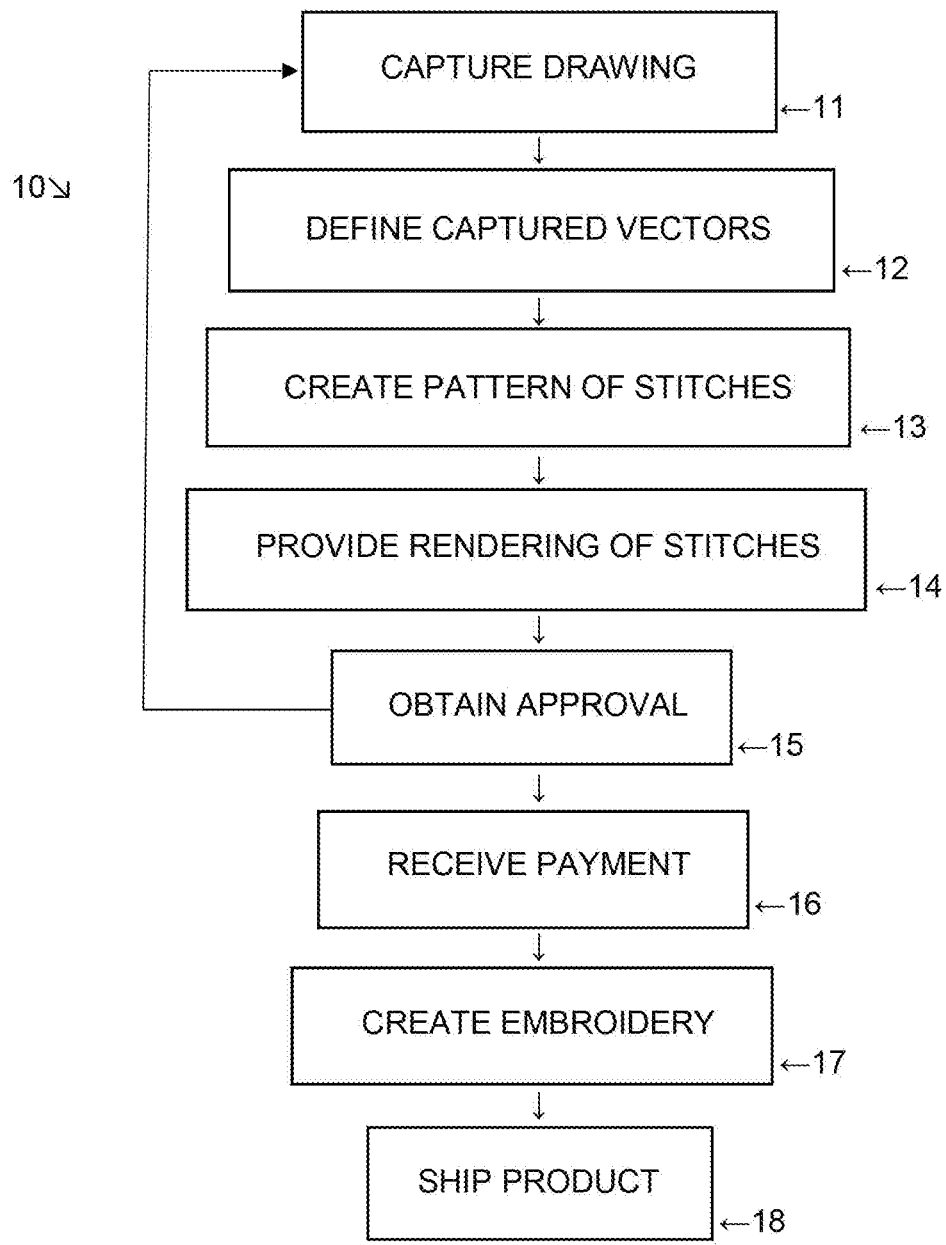
FIG. 1 is a flow chart illustrating an example of a (e.g., computer implemented) method of creating (e.g., customized) embroidery, for example, for a user.

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments are or concern (e.g., computerized) methods and software for creating (e.g., customized) embroidery. Embodiments include capturing a drawing (e.g., from a user), for instance, in a browser window, as captured vectors, transmitting, receiving, or using the captured vectors and, in many embodiments, desired stitching parameters (e.g., at an embroidery engine, for example, on a server), and creating a (e.g., planned) pattern of stitches, for example, from the captured vectors, the desired stitching parameters, or both. Some embodiments include transmitting, returning, receiving, or creating a rendering of the (e.g., planned) pattern of stitches, for example, to the browser, or in certain embodiments, transmitting, receiving, returning, or creating rendering vectors (e.g., to the browser), for example, for drawing the (e.g., planned) pattern of stitches (e.g., in the browser), for instance, for inspection (e.g., by the user). In various embodiments, the drawing can include a freehand drawing, calligraphy, writing, handwriting, a signature, or a combination thereof, for example, that is drawn or (e.g., calligraphically) written by the user (e.g., in the browser window). In some embodiments, the (e.g., desired) stitching parameters can include angle, width, underlay type, density, pull compensation, or a combination thereof (e.g., recipe, for instance, based on fabric), for example, of the stitches. In some embodiments, for example, width varies, for instance, along a vector path, for example, based on pressure applied by the user while drawing.

Figure 2:
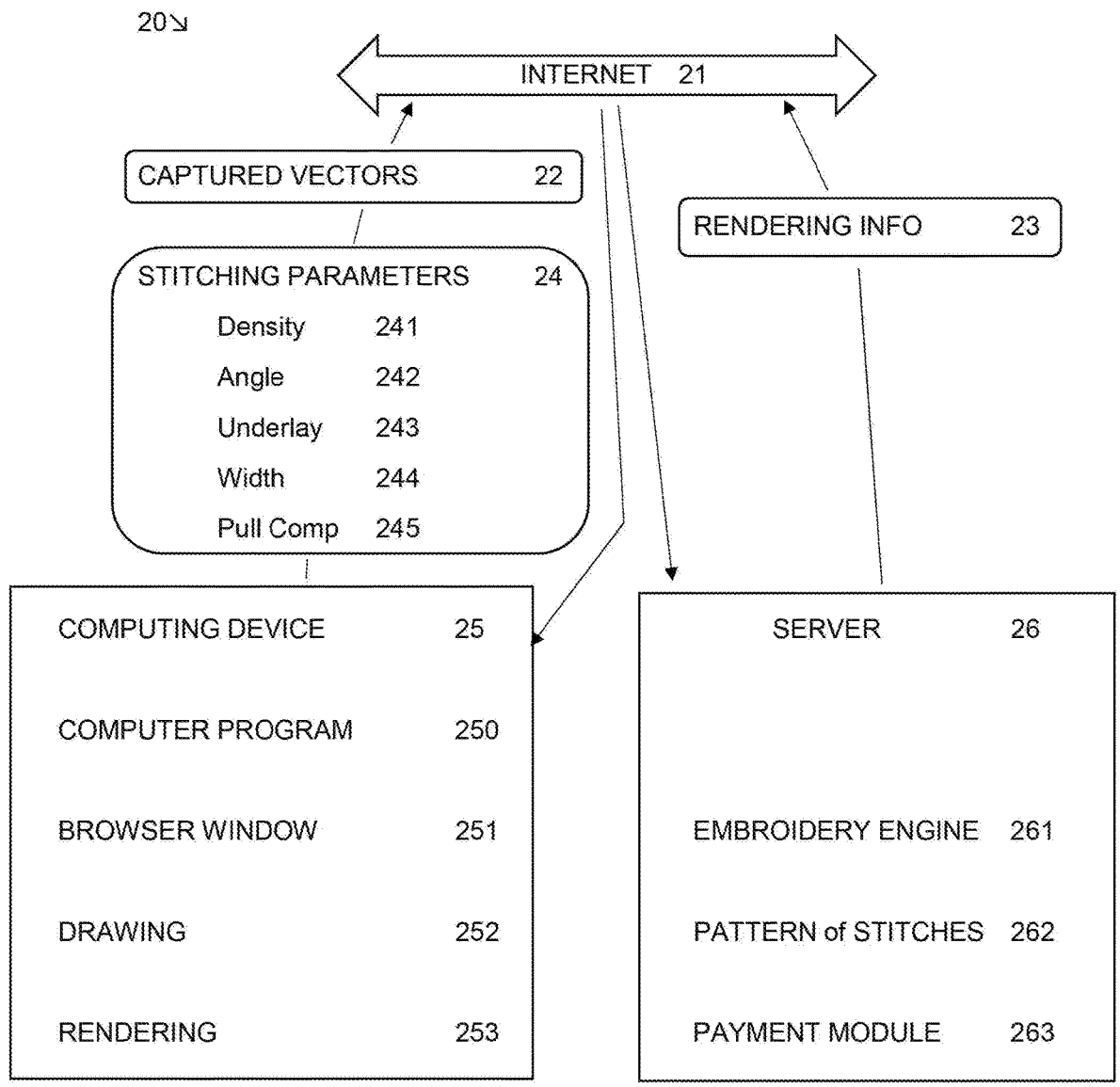
FIG. 2 is a block diagram illustrating an example of a system of creating (e.g., customized) embroidery, for example, that may be used to implement a method, for example, as shown in FIG. 1.
Figure 3:
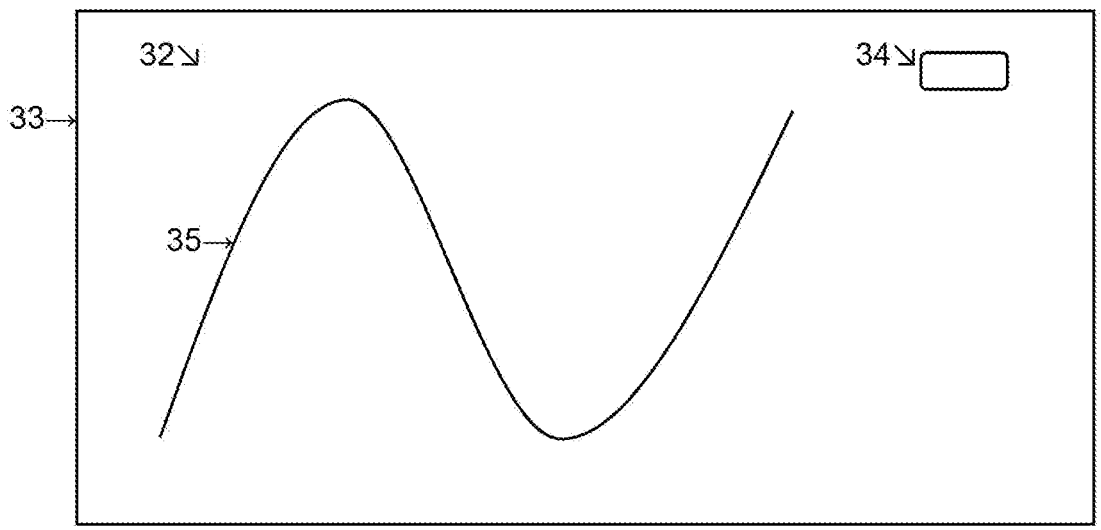
FIG. 3 is an example of a screen shot illustrating how a drawing (e.g., from a user) can be captured, for instance, in a system or method of creating (e.g., customized) embroidery, for example, (e.g., in a browser window)

FIG. 1 illustrates, as an example, (e.g., computer implemented) method 10 of creating (e.g., customized) embroidery, for example, for a user. FIG. 2 illustrates system 20 that can be used, for example, to implement method 10. In the embodiment shown, method 10 includes (e.g., using computer or computing device 25 shown in FIG. 2) capturing (e.g., act 11) a creative work or drawing (e.g., 252), for example, from the user, for instance, in browser window 251 shown in FIG. 2 or browser window 31 shown in FIG. 3. FIG. 3 illustrates how a drawing (e.g., 252 or 32), for instance, from a user, can be captured (e.g., in act 11, for instance, in browser window 251 or 31). In some embodiments, in a browser (e.g., browser window 251), the user is presented an area (e.g., 33) in which they can freehand draw, for example, using an input device, such as a finger or stylus, for instance, on a touch screen or with a mouse (e.g., connected to, or in communication with, computing device 25). In certain embodiments, the area (e.g., 33), has a scale (e.g., in mm, cm, or both, or in inches, tenths of an inch, eighths of an inch, sixteenths of an inch, or a combination thereof), for example, across the top or bottom, a side, or a combination thereof. In the embodiment shown, area 33 or browser window 31 includes tool or icon 34 that a user can select to make the drawing (e.g., 252 or 32). Various embodiments have one or more tools (e.g., 34) that can be selected by the user, for example, in the top, side, or corner (e.g., upper right corner) of the browser window (e.g., 31) or area (e.g., 33). Such tools (e.g., 34) can be used (e.g., by the user) to select color, width (e.g., 44), stitch type (e.g., 49 or 46), or a combination thereof, as examples. In some embodiments, several different tools (e.g., 34) can be selected. In a number of embodiments, the drawing (e.g., 252 or 32) is captured (e.g., in act 11) as (e.g., a first set of) captured vectors (e.g., 22). Further, in the embodiment shown, method 10 includes defining (e.g., or receiving or transmitting, act 12) the first set of captured vectors (e.g., 22). Still further, in a number of embodiments, the method (e.g., 10) or act (e.g., 11 or 12) further includes capturing (e.g., in act 11), defining (e.g., in act 12), receiving (e.g., at server 26), or transmitting (e.g., from computing device 25, for instance, desired) stitching parameters (e.g., 24), for instance, received at an embroidery engine (e.g., 261) on a server (e.g., 26). In a number of embodiments, an embroidery engine (e.g., 261) is software which takes as input shapes, for example, vector shapes, stitching parameters, or both, for instance. Further, in various embodiments, an embroidery engine (e.g., 261) generates and returns a pattern of stitches (e.g., vectors), for instance, based on the input (e.g., vector) shape, stitch parameters, or both.

Various embodiments include transmitting captured vectors (e.g., 22, for example, defined in act 12) along with (e.g., desired) stitching parameters (e.g., 24) to an embroidery engine (e.g., 261), for instance, on a server (e.g., 26) and having the server (e.g., 26) create stitches (e.g., in act 13) from those vectors (e.g., 22) and parameters (e.g., 24). FIG. 2 shows computing device 25 sending captured vectors 22 and stitching parameters 24 to embroidery engine 261 on server 26 via Internet 21, for example. In a number of embodiments, once the strokes have been drawn (e.g., captured in act 11 in browser window 31), the vectors or strokes (e.g., captured vectors 22) are (e.g., defined and) sent (e.g., in act 12) to the server (e.g., 26, for instance, specifically to embroidery engine 261) to be converted (e.g., in act 13) to embroidery (e.g., pattern of stitches 262 or rendering info 23), at the width (e.g., 244) specified (e.g., by the user, for instance, in stitching parameters 24). Further still, method 10 further includes creating (e.g., in act 13) a (e.g., planned) pattern of stitches (e.g., 262), for example, from the first set of captured vectors (e.g., 22, for instance, defined in act 12) and the (e.g., desired) stitching parameters (e.g., 24). Various processes of creating stitches (e.g., act 13), for instance, performed by the embroidery engine (e.g., 261) on the server (e.g., 26) are complex, for example, requiring many lines of source code (e.g., within embroidery engine 261) but are known in the art and available for license from multiple sources, for example.

In the embodiment shown, the creating (e.g., in act 13 in FIG. 1) of the (e.g., planned) pattern of stitches (e.g., 262 shown in FIG. 2), for example, from first set of captured vectors 22 and desired stitching parameters 24, is performed at server 26 and (e.g., desired) stitching parameters 24 are captured (e.g., in act 11) or defined (e.g., in act 12) using computing device 25, for instance, owned, operated, or both, by the user. In various embodiments, computing device 25 may be a desktop computer, laptop computer, tablet computer, smart phone, or machine controller device (e.g., a device controlling an embroidery machine) as examples, and a person of ordinary skill in the art would be able to select a suitable computing device. Further, in the embodiment shown, the capturing of the drawing (e.g., in act 11, for instance, in browser window 251 or 31, for example, drawing 252 or 32), for instance, as the (e.g., first set of) captured vectors (e.g., 22), does not include capturing the drawing (e.g., 252 or 32) as a bitmap. In various embodiments, capturing the drawing (e.g., 252 or 32) as a bitmap is not necessary (e.g., in act 11). A bitmap is an image which is a rendering (e.g., a picture) of the embroidery design. In contrast, in various embodiments, a pattern of stitch vectors is a list of the actual x and y movements or vectors that are sent to the embroidery machine to create the stitches.

Various embodiments specifically include capturing (e.g., in act 11) a drawing (e.g., 252 or 32), for instance, in a browser window (e.g., 251 or 31) as vectors (e.g., captured vectors 22), for example, rather than as a bitmap.

Figure 4:
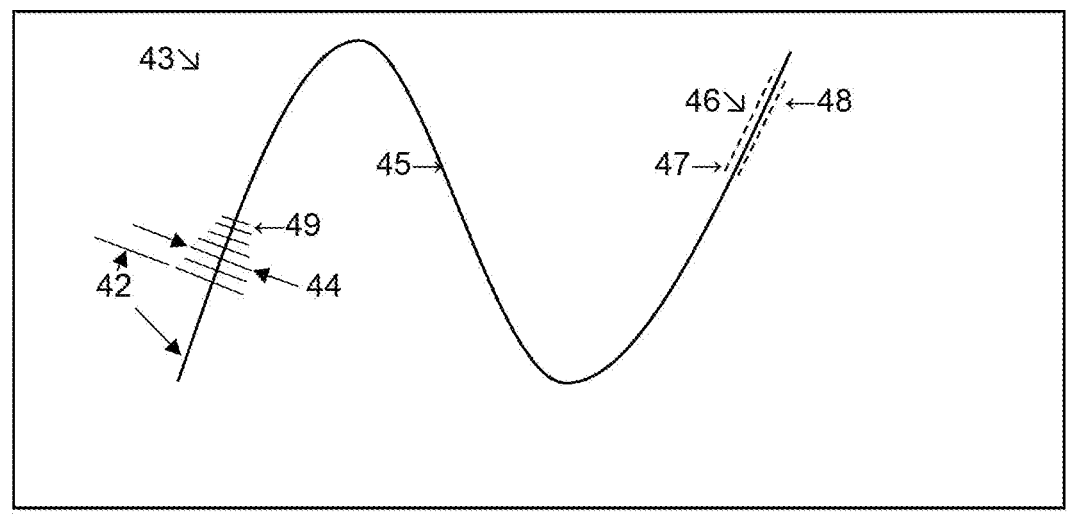
FIG. 4 is an example of a screen shot illustrating an example of a rendering (e.g., for inspection by the user) of a planned pattern of stitches (e.g., in a browser window) of a system or method, for instance, of creating (e.g., customized) embroidery, for example.

In certain embodiments, vectors (e.g., 22) are created in a web browser session (e.g., in browser window 251) for example, by importing the vectors (e.g., 22) from a file. Different embodiments include (e.g., in act 11, for instance, by the user) drawing one or more vector paths (e.g., 35 shown in FIG. 3), importing one or more vector paths (e.g., 35) from a file, or pasting one or more vector paths (e.g., 35) from a memory clipboard (e.g., Ctrl-C, Ctrl-V), or a combination thereof, as examples. Further still, some embodiments include (e.g., the user) editing those one or more vector paths (e.g., 35). FIGS. 3 and 4 show vector paths 35 and 45 that may have the same shape. Vector path 35 may have been drawn (e.g., by the user), for example, into browser window 31. Vector path 45 may be the same or similar to vector path 35 and may be used (e.g., by embroidery engine 261) to create (e.g., in act 13) the pattern of stitches (e.g., 262). Although vector path 45 is shown for illustration purposes in FIG. 4, in some embodiments, the vector path is not shown in the rendering of the stitches (e.g., provided in act 14, within rendering 253, or within rendering info 23). Further, although stitches 49 and 46 are only shown along part of vector path 45 in FIG. 4, stitches may often extend the entire length of the vector path. Further still, stitches are shown separated or spaced apart in FIG. 4, but in a number of embodiments, stitches may be much closer together (e.g., more densely spaced, i.e., density 241, for instance, partially or fully touching, or even overlapping).

In the embodiment shown, method 10 of FIG. 1 includes defining, returning, or providing (e.g., in act 14) a rendering (e.g., within rendering info 23, or rendering 253) of the (e.g., planned) pattern of stitches (e.g., 262). Some embodiments, for instance, include providing (e.g., in act 14), for instance, to the browser or browser window (e.g., 251, 31, or 41), the (e.g., planned) pattern of stitches (e.g., 262), for example, for inspection by the user. In particular embodiments, for example, the returning of the rendering of the planned pattern of stitches (e.g., 262) to the browser (e.g., 251) for inspection by the user (e.g., in act 14) includes specifically returning a bitmap, for example, of the (e.g., planned) pattern of stitches (e.g., 262) to the browser (e.g., 251, for instance, in window 31 or 41) for inspection by the user. Even further, the embodiment shown can include (e.g., in act 14) returning a second set of rendering vectors (e.g., within rendering info 23), for example, to browser 251, 31, or 41, for example, for drawing the (e.g., planned) pattern of stitches (e.g., 262), for instance, in browser 251, 31, or 41, for instance, for inspection by the user (e.g., for rendering 253 or 43). Even further still, in some embodiments, the second set of rendering vectors (e.g., of rendering info 23) includes at least one thousand individual rendering vectors, for instance, representing (e.g., planned) pattern of stitches 262. In some embodiments, the user clicks a button (e.g., a check mark in the lower left corner of the browser window (e.g., 31) to initiate acts 13 and 14 of creating the pattern of stitches (e.g., 262) and providing the rendering (e.g., 43). Further, in particular embodiments, the rendering (e.g., 43) is identified as such (e.g., as a "result"), for instance, in browser window 41.

Moreover, in method 10, the capturing (e.g., in act 11) of the creative work or drawing (e.g., 252 or 32), for instance, in the browser window (e.g., 251 or 31) includes capturing a freehand drawing (e.g., that is drawn by the user, for instance, in the browser window, for instance, 251 or 31), capturing calligraphy, writing, or handwriting (e.g., that is written by the user, for example, in the browser window, for instance, 251 or 31), capturing a signature (e.g., that is written by the user, for instance, in the browser window, for instance, 251 or 31), or a combination thereof. Drawings 252 and 32 are examples. Furthermore, in method 10, the (e.g., defining or receiving, for instance, receiving at server 26, for example, in act 12) of the first set of captured vectors (e.g., 22) and (e.g., desired) stitching parameters (e.g., 24), for instance, received at embroidery engine 261, for example, on server 26, includes receiving a (e.g., desired) angle (e.g., 242 shown in FIG. 2 or 42 shown in FIG. 4) of the stitches (e.g., stitches 49 of rendering 43), receiving a desired width (e.g., 244 or 44) of the stitches (e.g., 49), or both, for example. FIG. 4 illustrates a screen shot that shows rendering 43 (e.g., for inspection by the user) of a (e.g., planned) pattern of stitches (e.g., 262), for example, in browser window 41. Browser window 41 may be the same or similar to browser window 251, 31, or both, in some embodiments. Further, rendering 43 in FIG. 4 or as described herein may be the same as rendering 253 in FIG. 2. Various embodiments include returning (e.g., in act 14) a rendering (e.g., within rendering info 23, for instance, rendering 43 or 253) of the created (e.g., in act 13) stitches (e.g., 49, 46, or both, shown in FIG. 4) to the browser (e.g., browser window 251, 31, or 41) for inspection/viewing by the user, and/or returning thousands of vectors (e.g., rendering info 23) to the browser (e.g., of browser window 251, 31, or 41) in order to draw (e.g., in act 13 or 14), for instance, high quality stitching (e.g., stitches 49, 46, or both) in the browser (e.g., 41).

Further, in the embodiment shown, (e.g., the desired) width 44 of the stitches varies, for example, along vector path 45, which may be the same or similar to vector path 35 of the drawing (e.g., 252 or 32), for instance, from the user. Still further, in certain embodiments, the capturing (e.g., act 11) of the drawing (e.g., 252 or 32), for instance, in the browser window (e.g., 251 or 31) includes capturing the (e.g., desired) width (e.g., 44) of the stitches (e.g., 49, for instance, along vector path 45) based on pressure applied (e.g., by the user) while drawing (e.g., vector path 35, for instance, in browser window 251 or 31). In some embodiments, for example, the greater the pressure, the wider the width. Further still, in some embodiments, the creating (e.g., in act 13) of the (e.g., planned) pattern of stitches (e.g., 262), for instance, from the first set of captured vectors (e.g., 22) and the (e.g., desired) stitching parameters (e.g., 24) includes creating running stitches (e.g., 46), for instance, that are parallel to a vector path (e.g., 35 or 45), for instance, of the drawing (e.g., 252 or 32) from the user. As used herein, "parallel" means parallel to within ten (10) degrees, and stitches that are "parallel to a vector path" include stitches that are on or collinear with the (e.g., curved) vector path (e.g., zero offset distance between the stitches and vector path). Further, as used herein, other words used herein that define angles are to within ten (10) degrees unless indicated otherwise. Even further, in particular embodiments, the creating (e.g., in act 13) of the (e.g., planned) pattern of stitches (e.g., 262), for instance, from the first set of captured vectors (e.g., 22) and the (e.g., desired) stitching parameters (e.g., 24) includes creating multiple-ply running stitches (e.g., 46), for instance, that are parallel to the vector path (e.g., 35 or 45), for example, of the drawing (e.g., 252 or 32), for instance, from the user. FIG. 4 shows two plies 47 and 48 of running stitches 46 that are parallel to and offset from vector path 45. Other embodiments or drawings (e.g., 252) may have 1, 3, 4, 5, 6, 7, or more plies, as other examples, which may be parallel to, off set from, or both, relative to the vector path. In certain embodiments, one ply is not offset (i.e., has a zero offset) from the vector path and one or more (e.g., an even number of) other plies are offset (i.e., has or have a non-zero offset from) the vector path.

Even further still, in some embodiments (e.g., of method 10), the defining (e.g., in act 12) or receiving (e.g., at embroidery engine 261, for instance, on server 26) of the first set of captured vectors (e.g., 22) and (e.g., desired) stitching parameters (e.g., 24) includes (e.g., receiving for instance, from the user, or at embroidery engine 261, for example, on server 26) an underlay type (e.g., 243) of the stitches, receiving a density (e.g., 241) of the stitches (e.g., 49), receiving a pull compensation (e.g., 245) of the stitches, or a combination thereof, as examples. In some embodiments, the user selects the width (e.g., 244) and if the selected width (e.g., 244) is quite narrow, then the stitches are created using a "run" or "bean" type of stitch (e.g., 46). If the selected width (e.g., 244) is wider, then satin stitches (e.g., 49) are created, for instance, at the specified (e.g., fixed or variable) width (e.g., 44). In some embodiments, satin stitches (e.g., 49) can either be orthogonal to the stroke path (e.g., vector path 35 or 45) or at a specified angle (e.g., 242 or 42), for instance, to simulate a calligraphy pen. Moreover, particular embodiments create the stitches (e.g., 49) with appropriate density (e.g., 241), underlay (e.g., 243), or both, for instance, in order to match the needs of the (e.g., desired) target fabric (e.g., of stitching parameters 24).

Many embodiments include passing the vector path (e.g., 35), for instance, via captured vectors (e.g., 22), for instance, along with the desired attributes of the resulting stitches (e.g., stitching parameters 24) to the embroidery engine (e.g., 261). In various embodiments, the attributes (e.g., stitching parameters 24) include (e.g., desired) angle (e.g., 242 or 42) of the stitches (e.g., 49). In some embodiments, the stitch angle (e.g., 242 or 42) is orthogonal to the vector path (e.g., 45) or the stitches (e.g., 49) are 90 degrees to the path (e.g., 45). Further, in some embodiments, the stitch angle (e.g., 242 or 42) is relative to the vector path (e.g., 45) at the stitch (e.g., of stitches 49), and turns as the path turns, but in other embodiments, the stitch angle (e.g., 242 or 42) is a fixed angle, for instance, 135 degrees (e.g., from vertical or from horizontal), and thus, simulates the look of a calligraphy pen. In some embodiments, the stitch angle (e.g., 242 or 42) is selected by the user (e.g., in act 11, browser window 251, or both). Still further, in some embodiments, it is selectable by the user whether the stitch angle (e.g., 242 or 42) is relative to the vector path (e.g., 45) at the stitch (e.g., 49), or is a fixed angle. In various embodiments, the user is prompted to make a selection (e.g., for stitching parameters 24).

In various embodiments, the attributes (e.g., stitching parameters 24) include (e.g., desired) width (e.g., 244 or 44) of the stitches (e.g., 49), for example, around the vector path (e.g., 45). For example, in some embodiments, the stitches (e.g., 49) have a fixed width (e.g., 3 mm wide). But in some embodiments, stitches (e.g., 49) may vary in width (e.g., 44) along the path (e.g., 45), for instance, as shown in FIG. 4. For example, the stitches may start very narrow and then go to the target width, and then end narrow at the end of the path, in a tapered fashion. This may simulate the look of a brush stroke, for instance. Or the stitches (e.g., 49) may vary in width (e.g., 244 or 44) depending on the pressure applied, for example, to a stylus used by the user while drawing the path (e.g., 45), for instance, on a pressure-sensitive touch screen (e.g., of computing device 25). Finally, the stitches could be extremely narrow, like a fine pen stroke, in which case, running stitches (e.g., 46) may be used, which run along the length of the path (e.g., 45), rather than being orthogonal (e.g., like stitches 49) to the path, for example. If a little more width is desired in a running style stitch, multiple ply stitches or "bean" stitches may be used. FIG. 4 shows two plies, 47 and 48, but in different embodiments, 1, 2, 3, 4, 5, 6, 7, or more plies, as examples, may be selected by the user or selected (e.g., by embroidery engine 261) based on a width (e.g., 244 or 44) input or selection from the user.

Further, in various embodiments, the attributes (e.g., stitching parameters 24) include various (e.g., desired) embroidery settings, such as underlay type (e.g., 243), density (e.g., 241), pull compensation (e.g., 245), or a combination thereof, as examples. Still further, some embodiments, display (e.g., in act 14 or in a rendering, for instance, 43) a fabric image, for example, to match a (e.g., desired) target fabric (e.g., defined in act 11 or 12 or within stitching parameters 24). The fabric can be chosen either by the user or by the web site host (e.g., via embroidery engine 261), in various embodiments. Further still, some embodiments allow (e.g., prompt for, input, or include, for instance, within stitching parameters 24) for the selection of a "brush" or "pen" type. For example, a calligraphy brush may be selected, in some embodiments, that maintains the stitches (e.g., 49) at a fixed angle (e.g., 242 or 42), or a brush that tapers the stitches (e.g., 49) at the beginning and end of the stroke in order to appear to have been drawn with a brush. Even further, some embodiments allow for the selection of the width (e.g., 244 or 44) of the stroke. Even further still, some embodiments adjust the width (e.g., 244 or 44) of the stroke based on pressure sensitivity of the pressure on the touch screen. Moreover, various embodiments allow (e.g., within stitching parameters 24) for the selection of a thread color, for example, from a pallet of threads defined by the web site host (e.g., via embroidery engine 261). In some embodiments, one or more such attributes are selectable by the user. In various embodiments, the user is prompted (e.g., at computing device 25 or browser window 251 or 31) to make a selection (e.g., for stitching parameters 24). In particular embodiments, being able to apply the settings, for example, in this context, is part of the novelty.

In some embodiments, for example, in method 10, after the rendering (e.g., 43) of the stitches (e.g., 49 and 46) is provided (e.g., in act 14), approval (e.g., of rendering 43) is obtained or requested (e.g., act 15), for instance, from the user. Once the rendering is approved (e.g., in act 15), in certain embodiments, the user may be prompted (e.g., through browser window 251) to select and pay for a product (e.g., garment) containing the embroidery. Payment (e.g., from the user) may be received (e.g., in act 16), for instance, in various embodiments, by credit card or another payment method (e.g., via Internet 21, payment module 263, or both). Once payment is obtained (e.g., in act 16), in some embodiments, the embroidery may be created (e.g., in act 17) and, in various embodiments, the product may be shipped (e.g., in act 18), for example, to the user, for instance, by mail. In certain embodiments, when the user is satisfied with the result (e.g., rendering 43, for instance, provided in act 14), the user grants approval or submits the order (e.g., obtained in act 15). The drawn strokes (e.g., rendering info 23, or of rendering 43) are stored on a server (e.g., 26) in some embodiments. The stitches (e.g., 49, 46, or both) can be recreated, in particular embodiments, from the strokes (e.g., of act 11, captured vectors 22, stitching parameters 24, or a combination thereof), and can be re-purposed, in some embodiments, for example, for various desired target fabrics, using settings appropriate to the target fabric. Further, in particular embodiments, the resulting stitches (e.g., 49, 46, or both), for instance, from the web session with the user (e.g., provided in act 14) are stored, for instance, on the server (e.g., 26). Other embodiments, however, may differ.

Further, various embodiments include computer programs (e.g., 250 shown in FIG. 2), for example, that include computer-readable instructions which, when executed by the computing device (e.g., 25), cause the computing device to perform certain acts (e.g., of method 10). In some embodiments, for example, such acts include capturing (e.g., act 11) a drawing (e.g., 252 or 32, for instance, from a user), for example, as (e.g., a first set of) captured vectors (e.g., 22), and transmitting (e.g., act 12) the (e.g., first set of) captured vectors (e.g., 22) and (e.g., desired) stitching parameters (e.g., 24), for example, to an embroidery engine (e.g., 261), for instance, on a server (e.g., 26). Further, in many embodiments, such acts include displaying (e.g., act 14) a rendering (e.g., 43) of a (e.g., planned) pattern of stitches (e.g., created in act 13), for example, for inspection by the user. Still further, in a number of such embodiments, the (e.g., planned) pattern of stitches (e.g., in rendering info 23) has been created (e.g., in act 13) from the (e.g., first set of) captured vectors (e.g., 22) and the desired stitching parameters (e.g., 24), for example. Even further, in particular embodiments, the computer program (e.g., 250) further includes computer-readable instructions which, (e.g., when executed by the computing device, for instance, 25), cause the (e.g., computing device 25) to draw (e.g., in act 13 or 14) the (e.g., planned) pattern of stitches (e.g., 262 or rendering 43) for inspection by the user, for instance, using (e.g., a second set of) rendering vectors (e.g., within rendering info 23) returned to the computing device (e.g., 25) from the embroidery engine (e.g., 261) on the server (e.g., 26). If the rendering (e.g., 43) is not approved (e.g., in act 15), in some embodiments, the user may be allowed to change the drawing (e.g., 32 or 252), stitching parameters (e.g., 24), or both, and a new rendering (e.g., 43) may be provided. Even further still, in certain embodiments, the computer program (e.g., 250) includes computer-readable instructions which, when executed by the computing device (e.g., 25), cause the computing device to draw the (e.g., planned pattern of stitches e.g., 262 or rendering 43) for inspection by the user using a recipe that includes multiple parameters based on a type of fabric (e.g., selected by the user).

Other embodiments include an apparatus or method of obtaining or providing an apparatus or information, for instance, that include a novel combination of the features described herein. Even further embodiments include at least one means for accomplishing at least one functional aspect described herein. The subject matter described herein includes various means for accomplishing the various functions or acts described herein (e.g., of method 10) or that are apparent from the structure and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well.

Further, various embodiments of the subject matter described herein include various combinations of the acts, structure, components, and features described herein, shown in the drawings, described in any documents that are incorporated by reference herein, or that are known in the art.

Moreover, certain procedures can include acts such as manufacturing, obtaining, or providing components that perform functions described herein or in the documents that are incorporated by reference. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A computerized method of creating customized embroidery for a user, the method comprising at least acts of:
   using a computing device, capturing a drawing from the user in a browser window as a first set of captured vectors;
   receiving the first set of captured vectors and desired stitching parameters at an embroidery engine on a server, wherein the stitching parameters include embroidery settings; and
   creating a planned pattern of embroidery stitches from the first set of captured vectors and the desired stitching parameters.

2. The method of claim 1 wherein the creating of the planned pattern of embroidery stitches from the first set of captured vectors and the desired stitching parameters is performed at the server and the desired stitching parameters are captured using the computing device.

3. The method of claim 1 further comprising returning a rendering of the planned pattern of embroidery stitches to the browser for inspection by the user.

4. The method of claim 3 wherein the returning of the rendering of the planned pattern of embroidery stitches to the browser for inspection by the user comprises returning a bitmap of the planned pattern of embroidery stitches to the browser for inspection by the user.

5. The method of claim 1 further comprising returning a second set of rendering vectors to the browser for drawing the planned pattern of embroidery stitches in the browser for inspection by the user.

6. The method of claim 1 wherein the capturing of the drawing in the browser window comprises capturing a freehand drawing that is drawn by the user in the browser window.

7. The method of claim 1 wherein the capturing of the drawing in the browser window comprises capturing handwriting that is written by the user in the browser window.

8. The method of claim 1 wherein the capturing of the drawing in the browser window comprises capturing a signature that is written by the user in the browser window.

9. The method of claim 1 wherein the receiving of the first set of captured vectors and desired stitching parameters at the embroidery engine on the server comprises receiving a desired angle of the embroidery stitches.

10. The method of claim 1 wherein the receiving of the first set of captured vectors and desired stitching parameters at the embroidery engine on the server comprises receiving a desired width of the embroidery stitches.

11. The method of claim 10 wherein the desired width of the embroidery stitches varies along a vector path of the drawing from the user.

12. The method of claim 11 wherein the capturing of the drawing in the browser window comprises capturing the desired width of the embroidery stitches along the vector path based on a pressure applied by the user while drawing the vector path in the browser window.

13. The method of claim 1 wherein the creating of the planned pattern of embroidery stitches from the first set of captured vectors and the desired stitching parameters comprises creating running stitches that are parallel to a vector path of the drawing from the user.

14. The method of claim 1 wherein the creating of the planned pattern of embroidery stitches from the first set of captured vectors and the desired stitching parameters comprises creating multiple-ply running stitches that are parallel to a vector path of the drawing from the user.

15. The method of claim 1 wherein the receiving of the first set of captured vectors and desired stitching parameters at the embroidery engine on the server comprises receiving an underlay type of the embroidery stitches.

16. The method of claim 1 wherein the receiving of the first set of captured vectors and desired stitching parameters at the embroidery engine on the server comprises receiving a density of the embroidery stitches.

17. The method of claim 1 wherein the receiving of the first set of captured vectors and desired stitching parameters at the embroidery engine on the server comprises receiving a pull compensation of the embroidery stitches.

18. A computer program comprising computer-readable instructions which, when executed by a computing device, cause the computing device to:
   capture a drawing from a user as a first set of captured vectors;
   transmit the first set of captured vectors and desired stitching parameters to an embroidery engine on a server; and
   display a rendering of a planned pattern of embroidery stitches for inspection by the user wherein the planned pattern of embroidery stitches has been created from the first set of captured vectors and the desired stitching parameters.

19. The computer program of claim 18 further comprising computer-readable instructions which, when executed by the computing device, cause the computing device to draw the planned pattern of embroidery stitches for inspection by the user using a second set of rendering vectors returned to the computing device from the embroidery engine on the server.

20. The computer program of claim 18 further comprising computer-readable instructions which, when executed by the computing device, cause the computing device to draw the planned pattern of embroidery stitches for inspection by the user using a recipe comprising multiple parameters based on a type of fabric.

* * * * *